US012196689B2

(12) United States Patent
Troy et al.

(10) Patent No.: US 12,196,689 B2
(45) Date of Patent: Jan. 14, 2025

(54) SYSTEMS AND METHODS FOR DETECTING ANOMALIES IN OBJECTS

(71) Applicant: THE BOEING COMPANY, Chicago, IL (US)

(72) Inventors: James J. Troy, Issaquah, WA (US); Gary E. Georgeson, Tacoma, WA (US); Armando Xavier Membrila, Bothell, WA (US); Phillip Riste, Everett, WA (US); Gregory James Sweers, Renton, WA (US); Walter Joseph Jarecki, Chino Hills, CA (US)

(73) Assignee: The Boeing Company, Chicago, IL (US)

( * ) Notice: Subject to any disclaimer, the term of this patent is extended or adjusted under 35 U.S.C. 154(b) by 298 days.

(21) Appl. No.: 17/571,619

(22) Filed: Jan. 10, 2022

(65) Prior Publication Data

US 2023/0221263 A1    Jul. 13, 2023

(51) Int. Cl.
*G01N 21/958* (2006.01)
*B64C 39/02* (2023.01)
*B64U 101/30* (2023.01)

(52) U.S. Cl.
CPC ......... *G01N 21/958* (2013.01); *B64C 39/024* (2013.01); *B64U 2101/30* (2023.01); *G01N 2201/0214* (2013.01)

(58) Field of Classification Search
CPC .......... G01N 21/958; G01N 2201/0214; B64C 39/024; B64U 2101/30
See application file for complete search history.

(56) References Cited

U.S. PATENT DOCUMENTS

| 3,593,015 A | * | 7/1971 | Marchant | B60S 1/60 |
| | | | | 15/250.002 |
| 7,511,807 B2 | | 3/2009 | Fang | |
| 7,859,655 B2 | | 12/2010 | Troy | |
| 8,744,133 B1 | | 6/2014 | Troy | |
| 10,625,427 B2 | | 4/2020 | Troy | |

(Continued)

FOREIGN PATENT DOCUMENTS

| DE | 202011108834 | 1/2012 |
| EP | 2538393 | 12/2012 |

OTHER PUBLICATIONS

Extended European Search Report for EP 22202310.3-1020, dated May 26, 2023.

*Primary Examiner* — Jamil Ahmed
(74) *Attorney, Agent, or Firm* — Joseph M. Butscher; The Small Patent Law Group LLC

(57) ABSTRACT

A system and method for detecting an anomaly of an optically transparent or translucent object are disclosed. The system and method include a light source configured to emit light, a light transmission element having a textured surface, and an optical couplant configured to be disposed between the light transmission element and the object. At least a portion of the light emitted by the light source is configured to pass into the light transmission element through the textured surface and pass into the object through the optical couplant. At least a portion of the light that passes into the object internally reflects within the object and impinges on the anomaly to provide an illumination that indicates the location of the anomaly.

20 Claims, 12 Drawing Sheets

(56) References Cited

U.S. PATENT DOCUMENTS

| | | | |
|---|---|---|---|
| 2007/0165213 A1* | 7/2007 | Fang | G01N 21/552 |
| | | | 356/239.1 |
| 2014/0218510 A1* | 8/2014 | Nordbryhn | G07F 7/0609 |
| | | | 348/125 |
| 2018/0361595 A1* | 12/2018 | Troy | B25J 9/162 |
| 2019/0311555 A1 | 10/2019 | Troy | |
| 2020/0365428 A1* | 11/2020 | Tseng | G02B 5/0278 |
| 2021/0129971 A1 | 5/2021 | Brown | |
| 2021/0266461 A1 | 8/2021 | Koo | |

\* cited by examiner

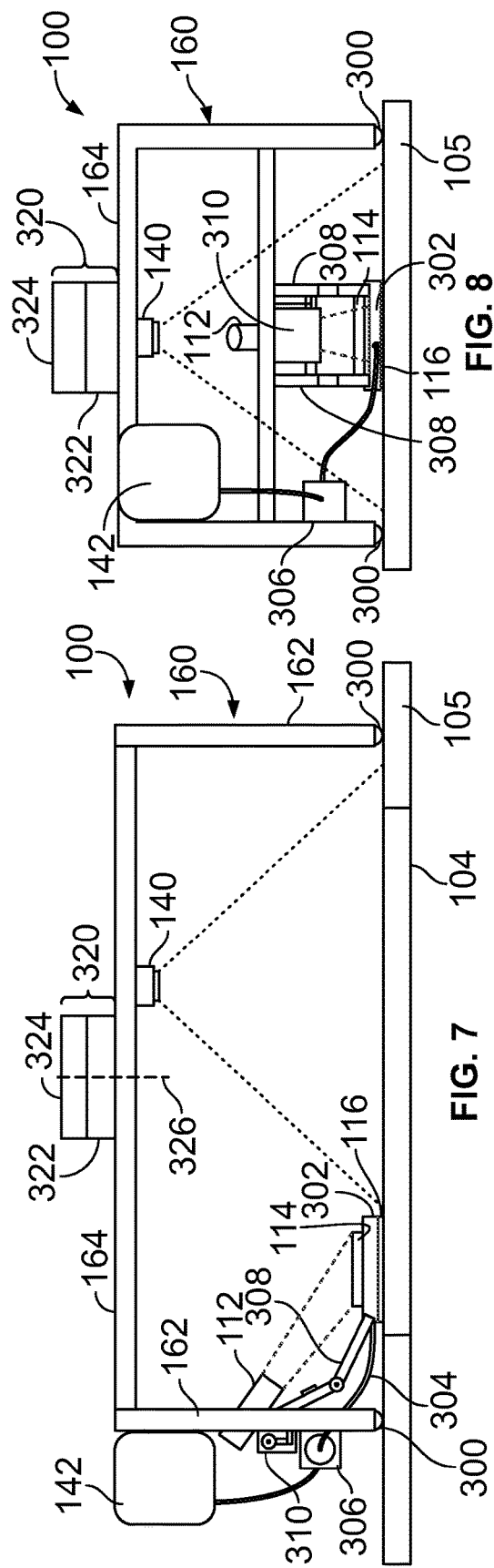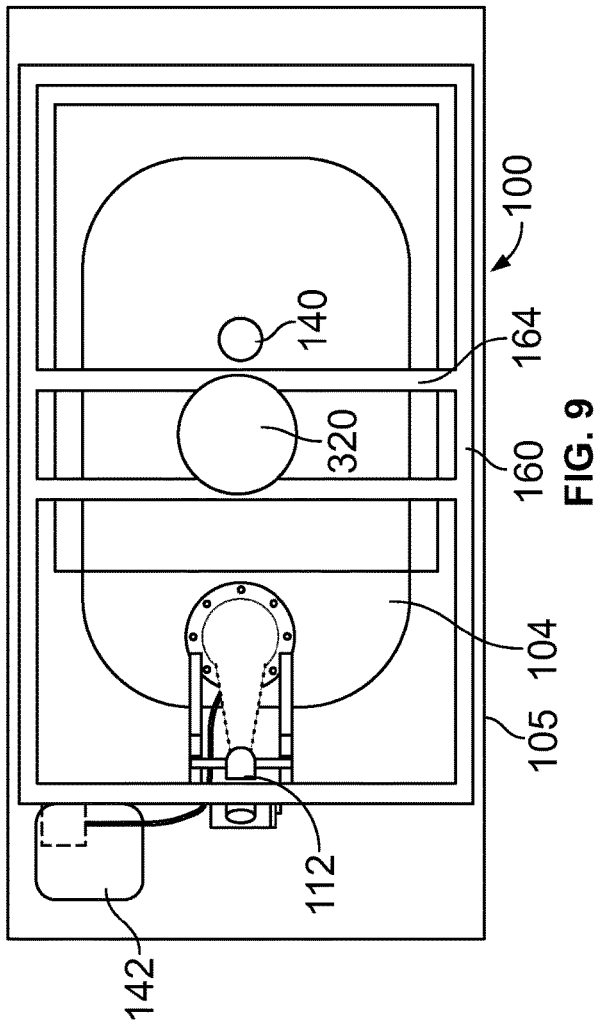

SYSTEMS AND METHODS FOR DETECTING ANOMALIES IN OBJECTS

FIELD OF THE DISCLOSURE

Examples of the subject disclosure generally relate to systems and methods for detecting anomalies, such as cracks, scratches, nicks, chips, grooves, cuts, or the like, in objects, such as windows.

BACKGROUND OF THE DISCLOSURE

Windows, windshields, and other transparent or translucent objects may be susceptible to anomalies. For example, a foreign object may impact such objects, thereby causing an anomaly such as a crack, scratch, nick, chip, pit, gouge, groove, divot, or the like to form. However, such an anomaly may not be readily visible to an individual.

Various vehicles include windows. For example, commercial aircraft include fuselages including numerous windows. Typically, individuals such as mechanics or inspectors utilize a lift to visually examine the windows for scratches. As can be appreciated, such a process is time and labor intensive. Moreover, scratches and cracks within the windows can compromise the integrity of the windows, and can be difficult to see with the naked eye.

SUMMARY OF THE DISCLOSURE

A need exists for a system and a method for detecting an anomaly in an object, such as a transparent or translucent structure (for example, a window, windshield, or the like, which can be part of a vehicle). Further, a need exists for a system and a method that allow an individual to readily identify an anomaly in such an object.

With those needs in mind, certain examples of the subject disclosure provide a system for detecting an anomaly of an object (for example, a transparent object, such as a window). The system includes a light source configured to emit light, a light transmission element having a textured surface, and an optical couplant configured to be disposed between the light transmission element and the object. At least a portion of the light emitted by the light source is configured to pass into the light transmission element through the textured surface and pass into the object through the optical couplant. At least a portion of the light that passes into the object internally reflects within the object and impinges on the anomaly to provide an illumination that indicates the location of the anomaly.

As an example, the object is a window of a vehicle.

In at least one example, the textured surface is formed on a first surface of the light transmission element. The first surface is opposite from a second surface that is smooth. The first surface is between the light source and the second surface. The textured surface includes a plurality of variances. The second surface is devoid of variances.

In at least one example, the optical couplant comprises water.

In at least one example, the light source is configured to emit the light onto the light transmission element at an acute angle.

In at least one example, an imaging device is configured to acquire one or more images of the object as the light source emits the light onto the light transmission element.

In at least one example, a couplant applicator is configured to apply the optical couplant between the light transmission element and the object.

In at least one example, a control unit is in communication with the light source (and optionally other components). The control unit is configured to control operation of the light source (and optionally the other components).

In at least one example, the system further includes a support frame. The light source and the light transmission element are coupled to the support frame. As a further example, the system also includes a base having a plurality of wheels. The base is coupled to the support frame.

In at least one example, a rotator is coupled to the support frame. The rotator is configured to rotate the system between different orientations.

In at least one example, a handle coupled to the support frame.

In at least one example, an unmanned aerial vehicle (UAV) is coupled to the support frame.

In at least one example, one or more articulating arms are coupled to the support frame. In at least one further example, a mobile base is coupled to the one or more articulating arms.

In at least one example, a couplant distributor is configured to apply the optical couplant between the light transmission element and the object. In a further example, the couplant distributor includes an outer ring having a plurality of fluid outlets in fluid communication with an internal fluid passage.

Certain examples of the subject disclosure provide a method for detecting an anomaly of an object. The method includes disposing an optical couplant between a light transmission element and the object; emitting, from a light source, light onto a textured surface of the light transmission element; passing at least a portion of the light emitted by the light source into the light transmission element through the textured surface; passing the at least a portion of the light into the object through the optical couplant; internally reflecting at least a portion of the light that passes into the object within the object; impinging the at least a portion of the light that is internally reflected within the object on the anomaly; and illuminating the location of the anomaly in response to said impinging.

BRIEF DESCRIPTION OF THE DRAWINGS

FIG. 7 illustrates a side view of a system for detecting an anomaly in an object, according to an example of the subject disclosure.

FIG. 8 illustrates an end view of the system of FIG. 7.

FIG. 9 illustrates a top view of the system of FIG. 7.

DETAILED DESCRIPTION OF THE DISCLOSURE

The foregoing summary, as well as the following detailed description of certain examples will be better understood when read in conjunction with the appended drawings. As used herein, an element or step recited in the singular and preceded by the word "a" or "an" should be understood as not necessarily excluding the plural of the elements or steps. Further, references to "one example" are not intended to be interpreted as excluding the existence of additional examples that also incorporate the recited features. Moreover, unless explicitly stated to the contrary, examples "comprising" or "having" an element or a plurality of elements having a particular condition can include additional elements not having that condition.

Examples of the subject disclosure provide a system and a method for detecting anomalies in objects, such as transparent or translucent objects. The system and method utilize total internal reflection lighting in transparent or translucent panels (for example, windows) to highlight anomalies. A light source and an intermediary light transmission element are used to infuse light into an object at a range of angles that set up a total internal reflection condition in the target object with light entering the object from an exposed surface of the object (in contrast to an edge). When total internal reflection occurs in the target object, anomalies within the object are highlighted by the internal light and can be easily seen by an individual and/or automatically detected using image processing, for example. Examples of the subject disclosure allow to anomalies within objects to be quickly and easily detected.

Figure 1:
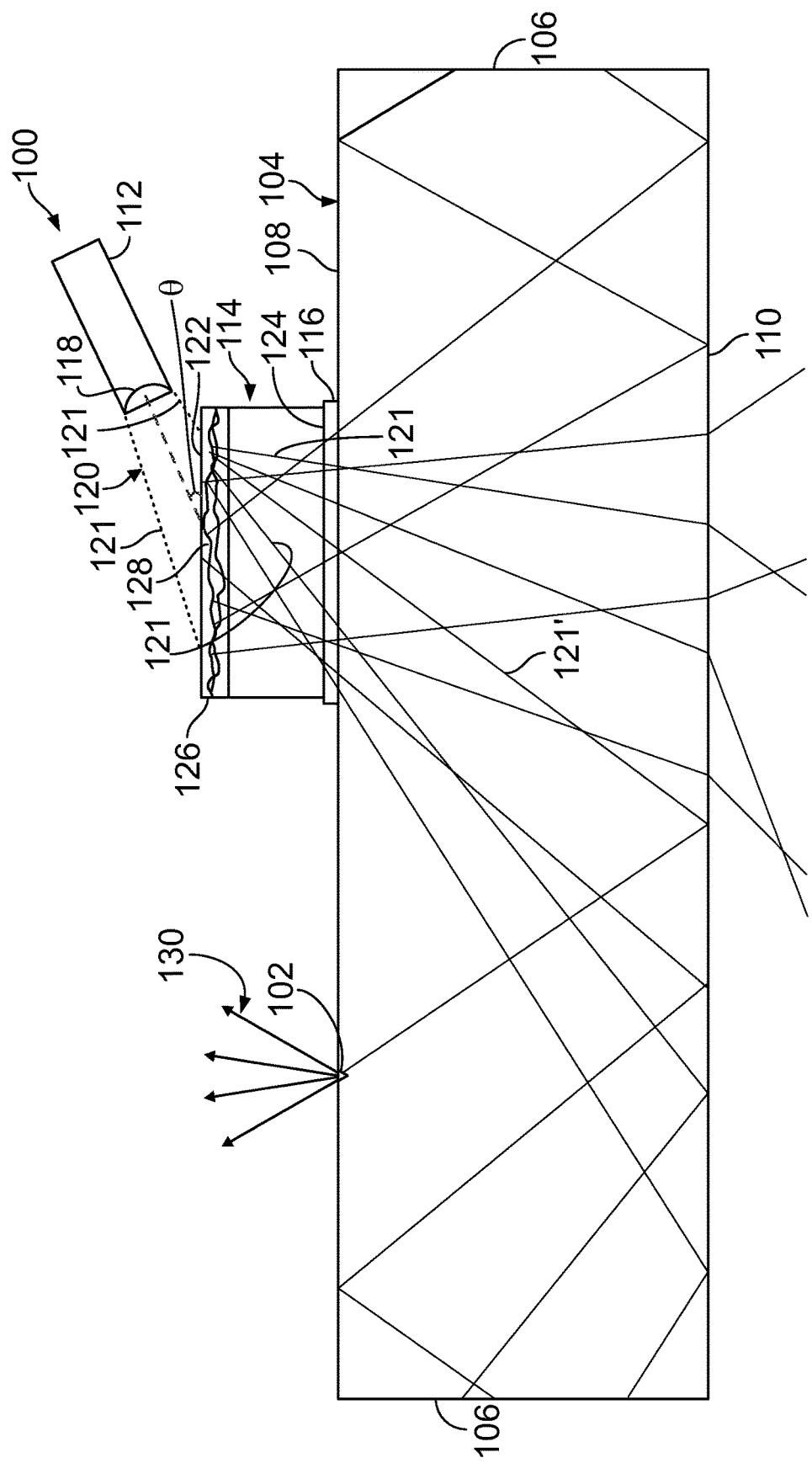
FIG. 1 illustrates a diagram of a system for detecting an anomaly in an object, according to an example of the subject disclosure.

FIG. 1 illustrates a diagram of a system 100 for detecting an anomaly 102 in an object 104, according to an example of the subject disclosure. The object 104 can be a transparent or translucent panel, such as a window, windshield, table top, and/or the like. The object 104 can be formed of glass, plastic, and/or the like. In at least one example, the object 104 is a window of a vehicle, such as a window in a fuselage of an aircraft. The object 104 includes peripheral edges 106, such as may be secured within a frame. As such, light from an exterior light source may not be able to enter the object 104 through the peripheral edges 106, as the frame blocks the light from entering. The object 104 includes a first exposed surface 108 and a second exposed surface 110 connected to the first exposed surface 108 by the peripheral edges 106 and/or interior structure. The first exposed surface 108 is opposite from the second exposed surface 110. The first exposed surface 108 can be an exterior exposed surface, and the second exposed surface 110 can be an interior exposed surface, or vice versa.

It is to be understood that the object 104 is not shown to scale in FIG. 1. Instead, the thickness of the object 104 is shown larger for illustrative purposes.

The system 100 includes a light source 112, a light transmission element 114, and an optical couplant 116. The light source 112 includes one or more light emitting elements 118 configured to emit light 120. For example, the light source 112 can be a lamp having one or more light bulbs, light emitting diodes (LEDs), and/or the like that are configured to emit the light 120.

The light transmission element 114 is formed of an optically transmissive material. For example, the light transmission element 114 is formed of transparent glass, plastic, or the like. As a further example, the light transmission element 114 is formed of clear acrylic. In at least one example, the light transmission element 114 has the same or similar index of refraction as the object 104. In at least one example, the light transmission element 114 is formed of the same or similar material as the object 104.

The light transmission element 114 includes a first surface 122 opposite from a second surface 124. The first surface 122 is proximate to the light source 112, and the second surface 124 is proximate to the object 104. As shown, the first surface 122 is between the light source 112 and the second surface 124. Conversely, the second surface 124 is between the object 104 and the first surface 122.

The first surface 122 is textured. As such, the first surface 122 is a textured surface 126. In at least one example, the first surface 122 is not entirely textured. For example, the textured surface 126 can be formed on less than entirety of the first surface 126. The textured surface 126 can be formed on an entirety or less than entirety of the first surface 122. The textured surface 126 can be a non-smooth surface that is roughened, scuffed, frosted, etched, machined, and/or other such surface. The textured surface 126 includes a plurality of variances 128 (such as grooves, channels, divots, and/or the like, which can be formed by application of a wire brush, file, sand paper, steel wool, and/or other surface preparation component, such as laser or chemical etching devices). The variances 128 provide areas where the light 120 can enter the light transmission element 114.

In at least one example, the variances 128 can be or otherwise include irregular features. As another example, the variances 128 can be or otherwise include regular pattern of features.

The second surface 124 is not textured. Instead, the second surface 124 is smooth. The second surface 124 can be devoid of variances.

The optical couplant 116 is a light transmissive fluid. For example, the optical couplant 116 is water. As another example, the optical couplant 116 is a clear gel. The optical couplant 116 can be applied to the first exposed surface 108 of the object 104 via a couplant applicator, which can be or otherwise include a bottle, reservoir, pump, and/or the like. In at least one example, an individual can apply the optical couplant 116 to the first exposed surface 108, whether or not from a dedicated couplant applicant applicator.

As shown, the optical couplant 116 is disposed between the first exposed surface 108 of the object 104, and the second surface 124 of the light transmission element 114. The optical couplant 116 directly contacts both the first exposed surface 108 of the object 104, and the second surface 124 of the light transmission element 114. As such, the optical couplant 116 is sandwiched between the light transmission element 114 and the object 104. The optical couplant 116 provides an uninterrupted pathway (for example, no air gaps) for light to travel between the object 104 and the light transmission element 114. The optical couplant 116 provides a smooth and even interface between the light transmission element 114 and the object 104, thereby compensating for surface curvature deviations or variances that may exist between the light transmission element 114 and the object 104. Accordingly, the optical couplant 116 provides a consistent and even optical path between the light transmission element 114 and the object 104.

The light source 112 is configured to emit the light 120 at an acute angle θ with respect to a plane of the first surface 122 of the light transmission element 114 (and/or a plane of the first exposed surface 108 of the object 104). That is, each ray 121 of the light 120 impinges upon the first surface 122 at an acute angle θ (in relation to a central aim axis of the light source 112). As an example, the acute angle θ can be between 15-60 degrees. As a further example, the acute angle θ can be between 40-50 degrees. As another example, the acute angle θ can be between 20-45 degrees. It has been found, through experimentation, that an acute angle θ between 20-45 degrees allows a plurality of rays 121 to pass into the light transmission element 114, into the object 104 via the optical couplant 116, and some of which internally reflect within the object 104. Alternatively, the arcuate angle can be less than 15 degrees, or greater than 60 degrees.

In operation, the light source 112 emits the light 120 having the plurality of rays 121 onto the light transmission element 114 (and optionally, the first exposed surface 108 of the object). The variances 128 in the textured surface 126 allows at least some of the rays 121 to pass into the light transmission element 114 (instead of reflecting off the first exposed surface 108). The rays 121 that pass into the light transmission element 114 pass through the second surface 124 and into the optical couplant 116, which abuts against the second surface 124. The optical couplant 116 provides a path for the rays 121 to pass into the first exposed surface 108 of the object 104 and into the object 104. Because the light source 112 emits numerous rays 121 at acute angles θ that enter the light transmission element 114 through the textured surface 126 (for example, via the variances), at least some of the rays 121 pass through the light transmission element 114 and into the object 104 through the optical couplant 116 at or greater than the critical angle needed for internal reflection within the object 104. Certain (for example, less than all) rays 121' internally reflect within the object 104 until impinging upon the anomaly 102. Because the anomaly provides an irregular surface within the object, the ray(s) 121' pass out of the object 104 through the anomaly 102, thereby providing an illumination 130 that is readily visible, such as by an individual, a camera, and/or the like. In this manner, the system 100 allows for quick, easy, and ready detection of the anomaly 102.

As described herein, the system 100 includes the light transmission element 114 having the textured surface 126. The optical couplant 116 is disposed between the light transmission element 114 and the object 104. The light source 112 emits the light 120 (which includes light rays 121) onto the textured surface 126, which allows rays 121 to pass into the light transmission element 114, and subsequently pass into the object 104 through the optical couplant 116. At least some of the rays 121 enter the object 104 at or greater than the critical angle needed for internal reflection. At least some of the rays 121 that internally reflect within the object 104 impinge on the anomaly 102, thereby providing the illumination 130 that readily identifies the anomaly 102.

In at least one example, the system 100 for detecting the anomaly 102 of the object 104 (such as on and/or within the object 104) includes the light source 112, which is configured to emit the light 120 (which includes light rays 121). The light transmission element 114 includes the textured surface 126. The optical couplant 116 is configured to be disposed between the light transmission element 114 and the object 104. At least a portion of the light 120 emitted by the light source 112 is configured to pass into the light transmission element 114 through the textured surface 126 and pass into the object 104 through the optical couplant 116. At least a portion of the light 120 that passes into the object 104 internally reflects within the object 104 and impinges on the anomaly 102 to provide the illumination 130, which indicates the location of the anomaly 102.

Figure 2:
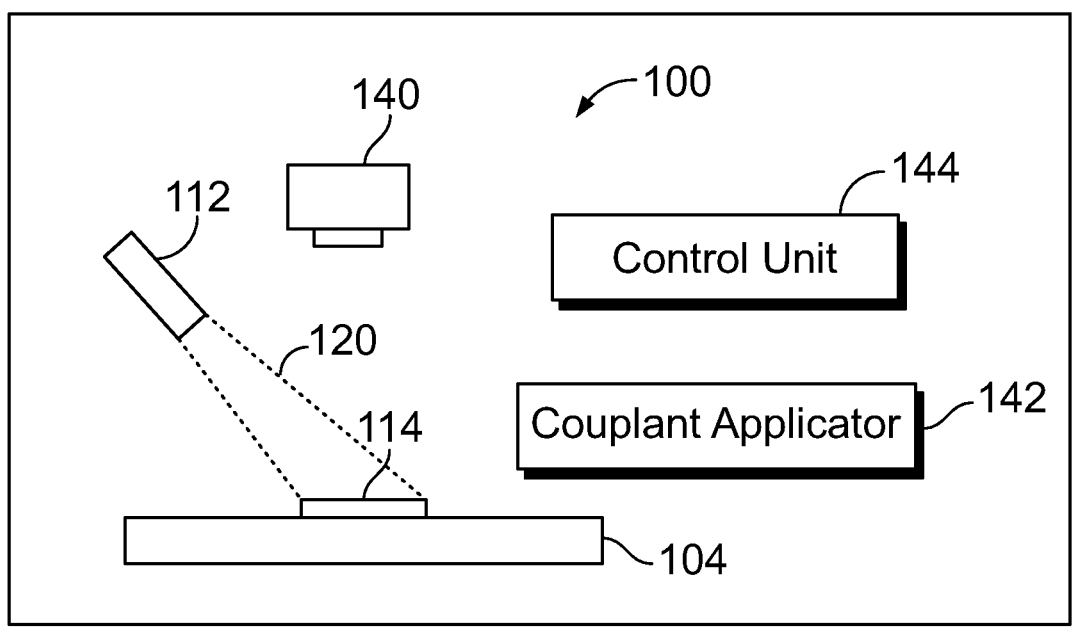
FIG. 2 illustrates a diagram of the system for detecting an anomaly in an object, according to an example of the subject disclosure.

FIG. 2 illustrates a diagram of the system 100 for detecting an anomaly in the object 104, according to an example of the subject disclosure. Referring to FIGS. 1 and 2, in at least one example, the system 100 also includes an imaging device 140 that is configured to acquire images of the object 104 as the light source 112 emits the light 120 onto the light transmission element 114. The imaging device 140 can be a photographic or video camera, for example. Optionally, the system 100 may not include the imaging device 140.

In at least one example, the system 100 also includes a couplant applicator 142 that is configured to apply the optical couplant 116 onto the object 104. For example, the couplant applicator 142 is configured to apply the optical couplant 116 between the light transmission element 114 and the object 104. In at least one example, the couplant applicator 142 includes one or more of a fluid-retaining vessel, such as a bottle, reservoir, or the like, a pump, an actuator, and/or the like. Optionally, the system 100 may not include the couplant applicator 142.

In at least one example, the system 100 also includes a control unit 144, which is configured to control operation of the system 100. The control unit 144 is in communication with the light source 112, such as through one or more wired or wireless connections, and is configured to control operation of the light source 112. The control unit 144 can also be in communication with the imaging device 140, such as through one or more wired or wireless connections, and is configured to control operation of the imaging device 140 and receive image data therefrom. The control unit 144 can also be in communication with the couplant applicator 142, and is configured to control operation of the couplant applicator 142. Optionally, the system 100 may not include the control unit 144.

As used herein, the term "control unit," "central processing unit," "CPU," "computer," or the like may include any processor-based or microprocessor-based system including systems using microcontrollers, reduced instruction set computers (RISC), application specific integrated circuits (ASICs), logic circuits, and any other circuit or processor including hardware, software, or a combination thereof capable of executing the functions described herein. Such are exemplary only, and are thus not intended to limit in any way the definition and/or meaning of such terms. For example, the control unit 144 may be or include one or more processors that are configured to control operation, as described herein.

The control unit 144 is configured to execute a set of instructions that are stored in one or more data storage units or elements (such as one or more memories), in order to process data. For example, the control unit 144 may include or be coupled to one or more memories. The data storage units may also store data or other information as desired or needed. The data storage units may be in the form of an information source or a physical memory element within a processing machine.

The set of instructions may include various commands that instruct the control unit 144 as a processing machine to perform specific operations such as the methods and processes of the various examples of the subject matter described herein. The set of instructions may be in the form of a software program. The software may be in various forms such as system software or application software. Further, the software may be in the form of a collection of separate programs, a program subset within a larger program, or a portion of a program. The software may also include modular programming in the form of object-oriented programming. The processing of input data by the processing machine may be in response to user commands, or in response to results of previous processing, or in response to a request made by another processing machine.

The diagrams of examples herein may illustrate one or more control or processing units, such as the control unit 144. It is to be understood that the processing or control units may represent circuits, circuitry, or portions thereof that may be implemented as hardware with associated instructions (e.g., software stored on a tangible and non-transitory computer readable storage medium, such as a computer hard drive, ROM, RAM, or the like) that perform the operations described herein. The hardware may include state machine circuitry hardwired to perform the functions described herein. Optionally, the hardware may include electronic circuits that include and/or are connected to one or more logic-based devices, such as microprocessors, processors, controllers, or the like. Optionally, the control unit 144 may represent processing circuitry such as one or more of a field programmable gate array (FPGA), application specific integrated circuit (ASIC), microprocessor(s), and/or the like. The circuits in various examples may be configured to execute one or more algorithms to perform functions described herein. The one or more algorithms may include aspects of examples disclosed herein, whether or not expressly identified in a flowchart or a method.

As used herein, the terms "software" and "firmware" are interchangeable, and include any computer program stored in a data storage unit (for example, one or more memories) for execution by a computer, including RAM memory, ROM memory, EPROM memory, EEPROM memory, and non-volatile RAM (NVRAM) memory. The above data storage unit types are exemplary only, and are thus not limiting as to the types of memory usable for storage of a computer program.

Figure 3:
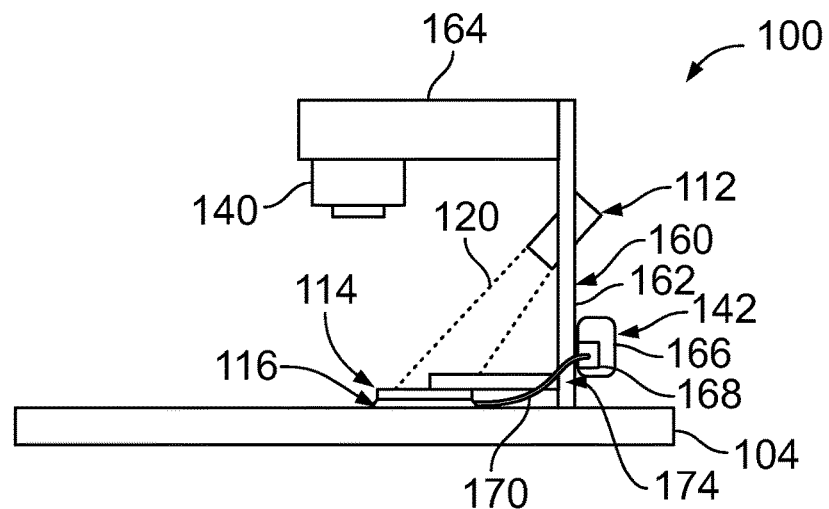
FIG. 3 illustrates a diagram of the system for detecting an anomaly in an object, according to an example of the subject disclosure.

FIG. 3 illustrates a diagram of the system 100 for detecting an anomaly in an object 104, according to an example of the subject disclosure. In this example, the system 100 includes a support frame 160 including one or more upright beams 162, and a cross beam 164 secures to the one or more upright beams 162. The support frame 160 can be disposed on the object 104.

The support frame 160 can be sized, shaped, and configured differently than shown. For example, the support frame 160 can include more upright beams 162 and cross beams 164 than shown. The beams 162 and 164 can be oriented differently than shown.

The imaging device 140 is secured to a portion of the cross beam 164. The light source 112 is mounted to a portion of the upright beam(s) 162. The couplant applicator 142 includes a fluid reservoir 166 that stores the optical couplant 116, and a pump 168 that is configured to output the optical couplant 116 onto the object 104 (and between the object 104 and the light transmission element 114) through a fluid delivery line 170, such as one or more tubes, conduits, or the like. Referring to FIGS. 1-3, in at least one example, the control unit 144 is configured to control the light source 112, the imaging device 140, and the couplant applicator 142.

The system 100 can also include a moveable arm 174 secured to the light transmission element 114, and moveable coupled the upright beam(s) 162. The moveable arm 174 is configured to be operated to move the light transmission element 114 to a desired position. In at least one example, the moveable arm 174 is operatively coupled to a motor or other such actuator, which can be controlled by the control unit 144.

Figure 4:
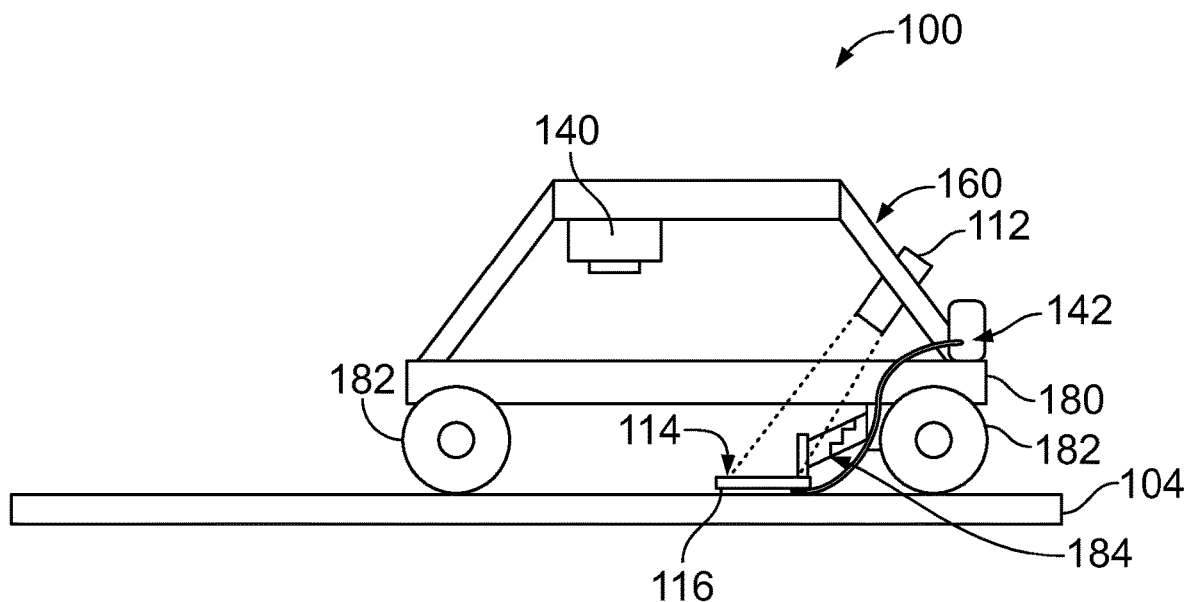
FIG. 4 illustrates a diagram of the system for detecting an anomaly in an object, according to an example of the subject disclosure.

FIG. 4 illustrates a diagram of the system 100 for detecting an anomaly in an object 104, according to an example of the subject disclosure. In this example, the system 100 includes a base 180 having a plurality of wheels 182 that are configured to roll over the object 104. The support frame 160 is secured to the base 180. One or more of the wheels 182 can be powered, such as via a motor, and controlled by the control unit 144 (shown in FIG. 2). As such, the system 100 can be part of a crawler vehicle that is configured to travel over the object 104. In at least one example, the light transmission element 114 can be coupled to a compliant mirror support mechanism 184, which can include a spring-loaded parallelogram linkage, for example.

Figure 5:
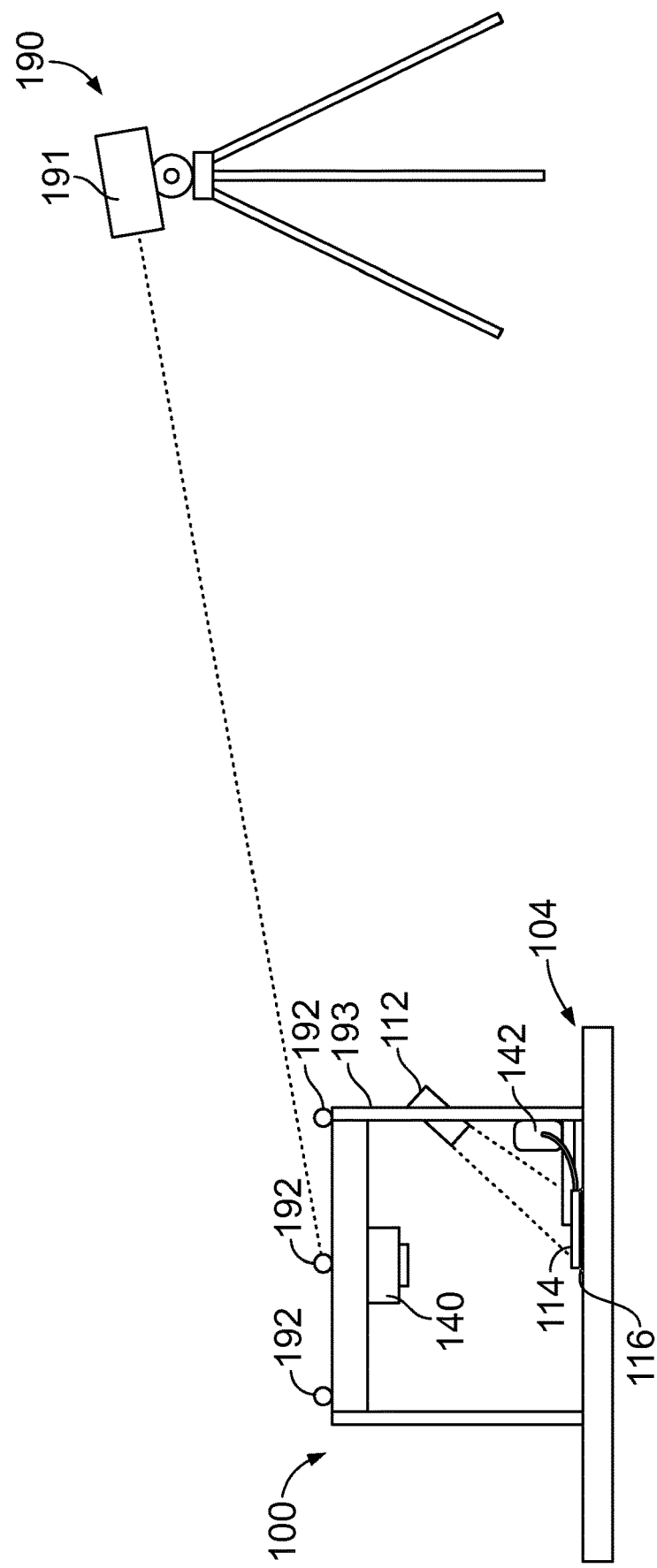
FIG. 5 illustrates a diagram of the system for detecting an anomaly in an object, according to an example of the subject disclosure.

FIG. 5 illustrates a diagram of the system 100 for detecting an anomaly in an object 104, according to an example of the subject disclosure. As shown, an external localization system 190 can be used to register images of the object with a local coordinate system. The external localization system 190 includes an imaging device 191 (such as a camera, electromagnetic tracking system, and/or the like), and optionally a laser measurement device. The imaging device 191 is configured to image a plurality of fiducials 192 disposed on a support frame 193 that retains the imaging device 140, the light source 112, and the light transmission element 114, for example. The fiducials 192, as imaged by the imaging device 191, are used to locate the various components, such as the support frame 193, in relation to images acquired by the imaging device 140. Information obtained by the external location system 190 can be combined with the image measurements from the pixel coordinates of the anomalies determined from the image difference detection, to produce location data for the anomalies in a specified coordinate system. Optionally, an external location system 190 may not be used.

Figure 6:
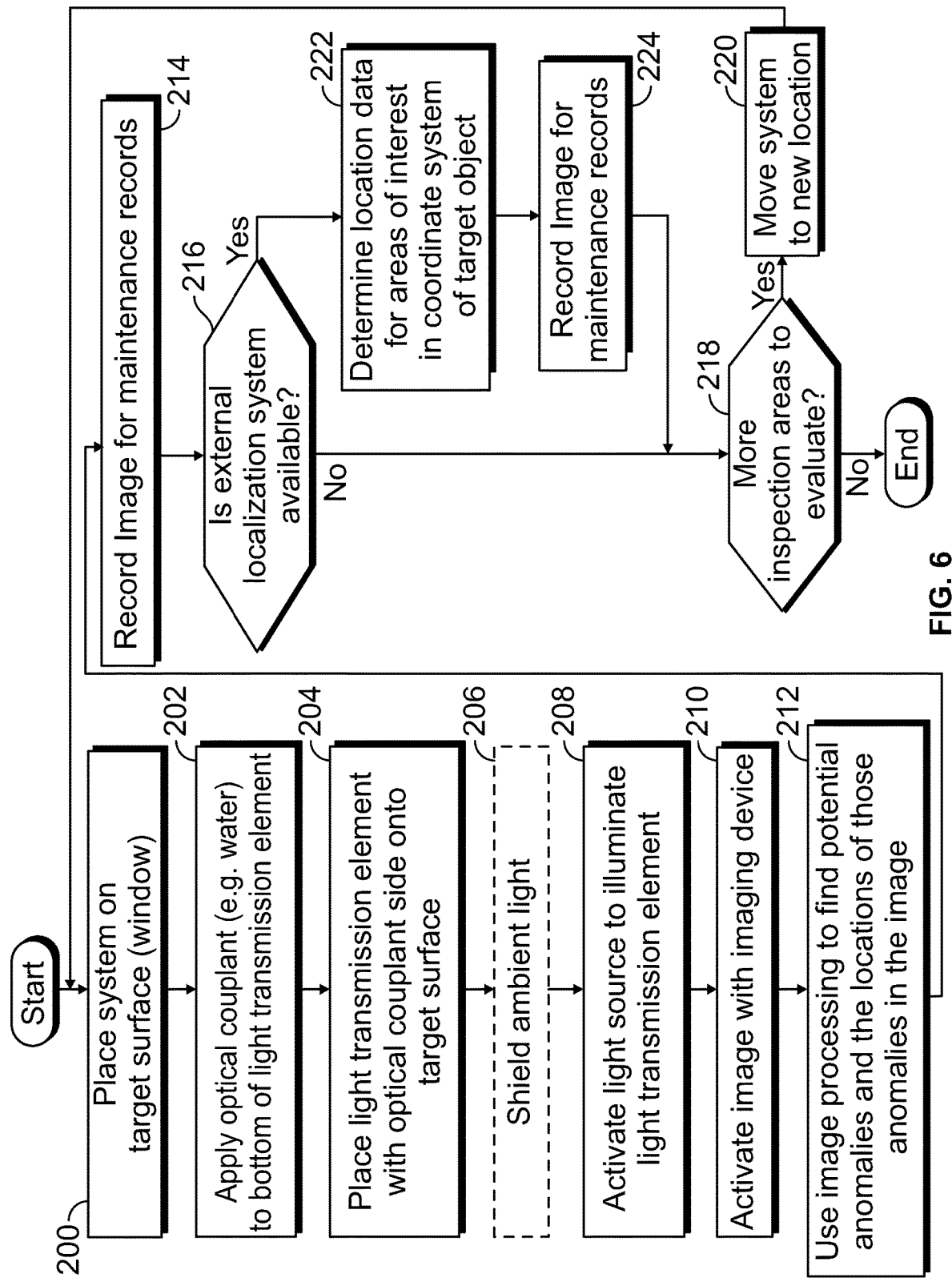
FIG. 6 illustrates a flow chart of a method of detecting an anomaly in an object, according to an example of the subject disclosure.

FIG. 6 illustrates a flow chart of a method of detecting an anomaly in an object, according to an example of the subject disclosure. Referring to FIGS. 1-6, at 200, the system 100 is placed on a target surface, such as the object 104 (a window, for example). At 202, the optical couplant 116 is applied on a bottom surface of the light transmission element 114. At 204, the light transmission element 114 is placed with the optical couplant 116 side onto the target surface. That is, the optical couplant 116 is disposed between and in contact with the light transmission element 114 and the object 104. Optionally, at 206, ambient light can be shielded, such as via an opaque shroud, cover, or the like. At 208, the light source 112 is activated to illuminate the light transmission element 114.

At 210, the imaging device 140 is operated to acquire one or more images of the object 104. At 212, the control unit 144 uses image processing techniques (such as difference detection methods) in relation to the image(s) to find potential anomalies, and identifies the locations of such anomalies in the image(s). At 214, the control unit 144 can then record such anomalies, such as within a memory.

Optionally, at 216, the control unit 144 can determine if an external localization system is available. If not, the method proceeds to 218 to determine if there are more inspection areas to evaluate. If so, the method continues to 220, at which the system 100 is moved, and the method then returns to 200. If not, the method ends.

If, however, at 216, an external localization system is available, the method proceeds to 222, at which the control unit 144 determines location data for areas of interest in a coordinate system of the object 104. Then, at 224, the control unit 144 records location data for maintenance records, and the method proceeds to 218.

FIG. 7 illustrates a side view of the system 100 for detecting an anomaly in an object 104, according to an example of the subject disclosure. FIG. 8 illustrates an end view of the system 100 of FIG. 7. FIG. 9 illustrates a top view of the system 100 of FIG. 7. Referring to FIGS. 7-9, the object 104 can be a window secured within a frame 105, such as a portion of a fuselage of an aircraft.

The system 100 includes a support frame 160 including upright beams 162 and a cross beam 164 secures to the upright beams 162. Contact components 300, such as elastomeric feet or rollers, extend toward the target surface. The contact components 300 abut the frame 105. A couplant distributor 302 can be secured around a periphery of the light transmission element 114. The couplant distributor 302 is in fluid communication with the couplant applicator 142, such as via fluid conduits 304 in communication with a pump 306.

The light transmission element 114 is coupled to an articulating arm 308, which is, in turn, operatively coupled to a motor 310. The control unit 144 (shown in FIG. 2) is configured to operate the motor 310 to move the light transmission element 114 via the articulating arm 308, as desired.

A rotator 320 can be operatively coupled to the support frame 160. The rotator 320 includes a rotatable joint 322 operatively coupled to an actuator 324, which is configured to rotate the system 100 about an axis 326.

In operation, the imaging device 140 acquires one or more images of the object 104 when the system 100 is in a first orientation, as shown in FIG. 9. Because the light transmission element 114 may block portions of the object 104 from being imaged, the rotator 320 is configured to rotate the system 100 to a second orientation that differs from the first orientation. For example, the rotator 320 rotates the system 100 180 degrees about the axis 326 to ensure that the light transmission element 114 is moved from its previous position. The imaging device 140 then takes another image of the object 104 to ensure that the area that may have previously been covered by the light transmission element 114 is exposed. The first image(s) and the second image(s) can then be analyzed by the control unit 144 (shown in FIG. 2) to determine locations of any anomaly.

In at least one example, the control unit 144 is configured to receive image data from the imaging device 140, and process the image data to detect an outer frame or periphery of the object 104. As such, the control unit 144 can utilize image processing to determine a location of the object 104.

Figure 10:
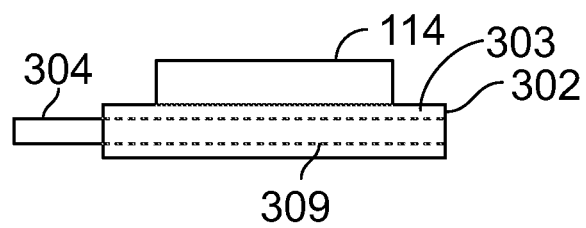
FIG. 10 illustrates a side view of a couplant distributor disposed around a light transmission element, according to an example of the subject disclosure.
Figure 11:
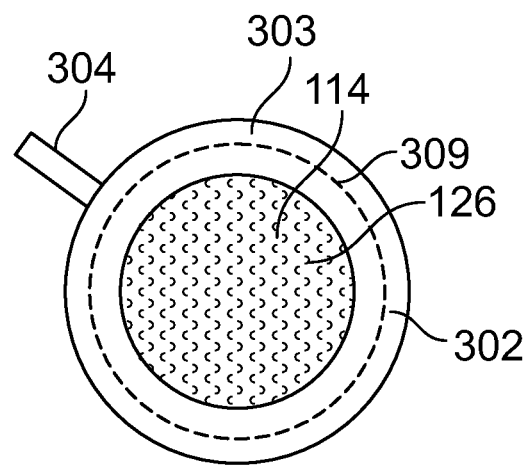
FIG. 11 illustrates a top view of the couplant distributor disposed around the light transmission element of FIG. 10.
Figure 12:
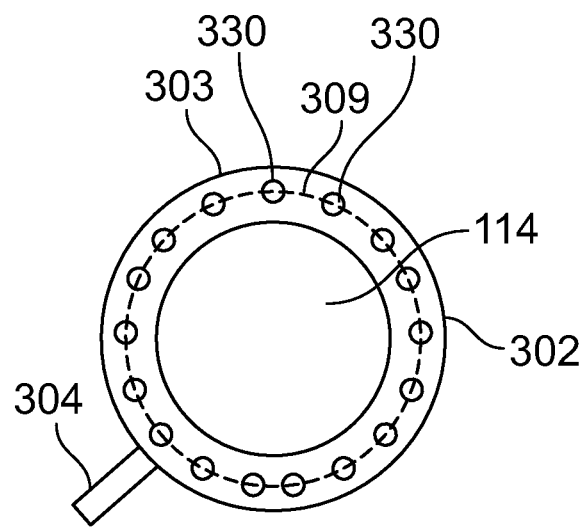
FIG. 12 illustrates a bottom view of the couplant distributor disposed around the light transmission element of FIG. 10.

FIG. 10 illustrates a side view of the couplant distributor 302 disposed around the light transmission element 114, according to an example of the subject disclosure. FIG. 11 illustrates a top view of the couplant distributor 302 disposed around the light transmission element 114 of FIG. 10. FIG. 12 illustrates a bottom view of the couplant distributor 302 disposed around the light transmission element 114 of FIG. 10. Referring to FIGS. 7-12, in at least one example, the couplant distributor 302 is an outer ring 303 defining an internal fluid passage 309 that is in fluid communication with the fluid conduit 304. Fluid outlets 330 are formed in the bottom surface of the outer ring 303. The fluid outlets 330 are in fluid communication with the internal fluid passage 309. The optical couplant 116 is deposited out of the couplant distributor 302 via the fluid outlets 330.

The couplant distributor 302 can be circular, oval-shaped, or the like. Optionally, the couplant distributor 302 can be sized and shaped differently than shown. For example, the couplant distributor 302 can be rectangular, square shaped, triangularly shaped, irregularly shaped, or the like.

Figure 13:
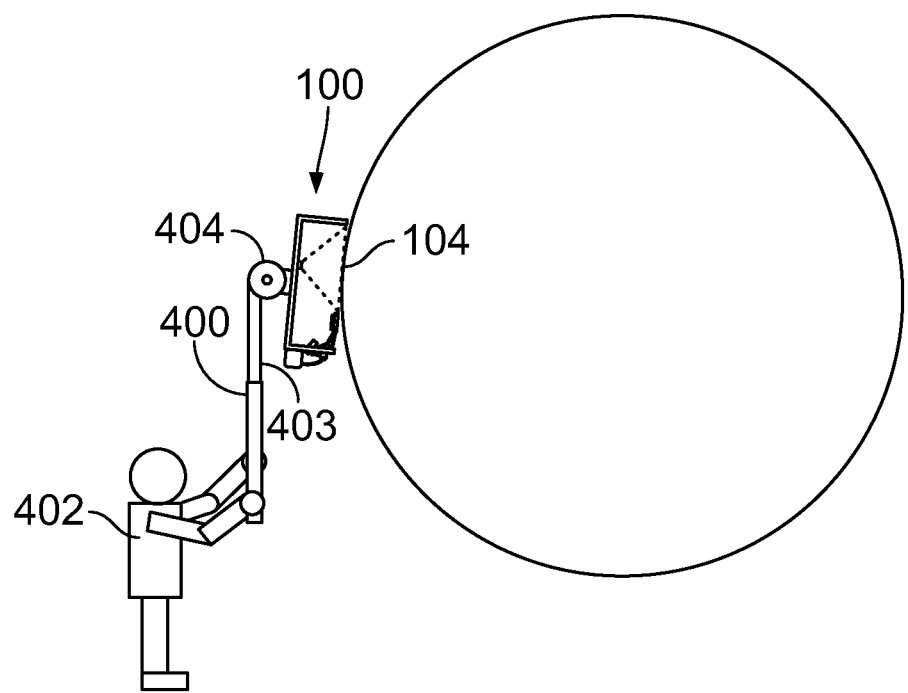
FIG. 13 illustrates a side view of a system for detecting an anomaly in an object, according to an example of the subject disclosure.

FIG. 13 illustrates a side view of a system 100 for detecting an anomaly in an object 104, according to an example of the subject disclosure. In this example, the system 100 includes a handle 400 secured to the support frame 160. The handle 400 is configured to be held by an individual 402. The handle 400 can include a telescoping portion 403, and a pivotal head 404, for example. In at least one other example, instead of a handle, the support frame 160 can be secured to a backpack, shoulder-mounted assembly, and/or the like.

Figure 14:
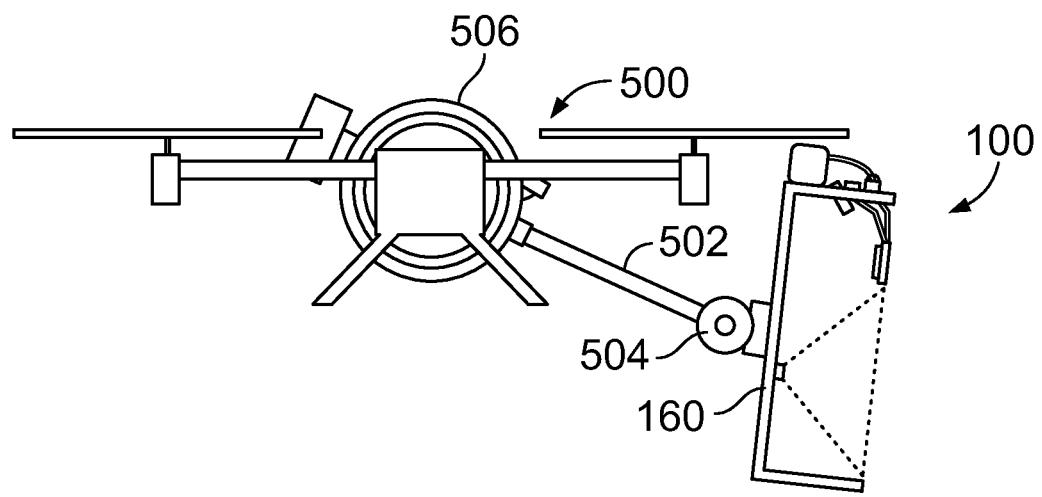
FIG. 14 illustrates a side view of a system for detecting an anomaly in an object, according to an example of the subject disclosure.

FIG. 14 illustrates a side view of a system 100 for detecting an anomaly in an object, according to an example of the subject disclosure. In this example, a vehicle 500, such as an unmanned aerial vehicle (UAV) couples to the support frame 160 through an arm 502. The arm 502 can be coupled to a pivotal joint 504 that pivotally couples to the support frame 160. An opposite end of the arm 502 can be coupled to a rotatable ring 506 of the vehicle 500.

Figure 15:
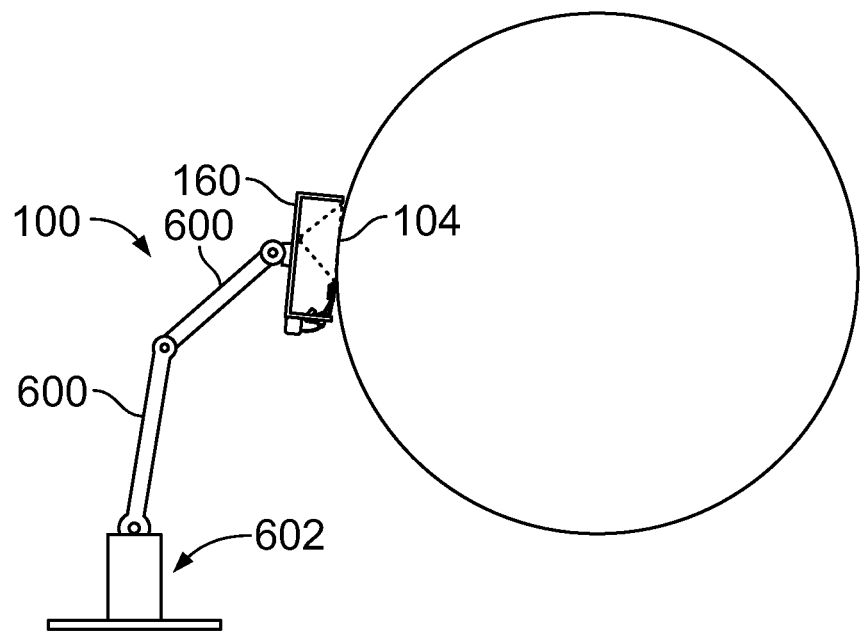
FIG. 15 illustrates a side view of a system for detecting an anomaly in an object, according to an example of the subject disclosure.

FIG. 15 illustrates a side view of a system 100 for detecting an anomaly in an object 104, according to an example of the subject disclosure. In this example, the support frame 160 is moveably coupled to one or more articulating arms 600 of a stationary robot 602 fixed to a floor or ground.

Figure 16:
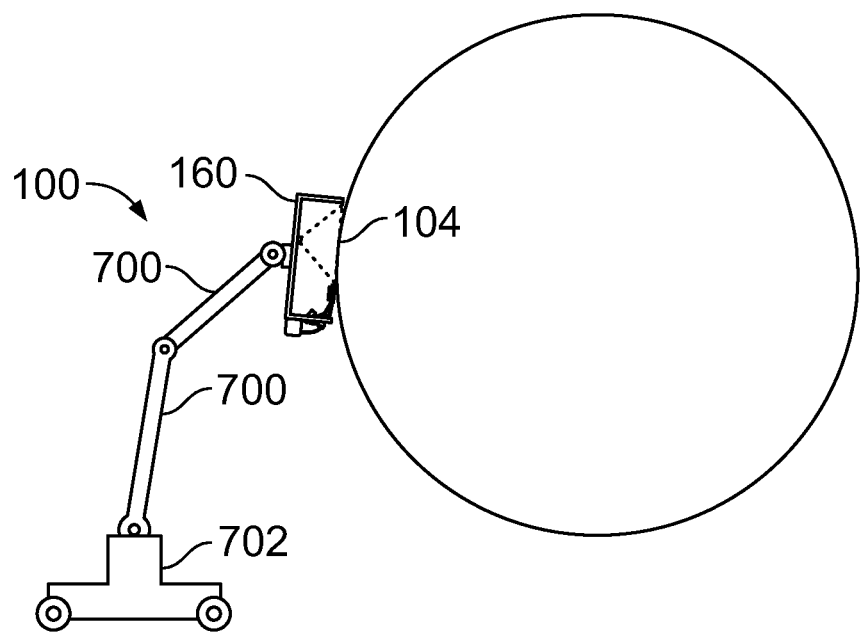
FIG. 16 illustrates a side view of a system for detecting an anomaly in an object, according to an example of the subject disclosure.

FIG. 16 illustrates a side view of a system 100 for detecting an anomaly in an object 104, according to an example of the subject disclosure. In this example, the support frame 160 is moveably coupled to one or more articulating arms 700 of a mobile base 702, which is configured to move over a floor or ground. In other embodiments, the mobile base can also be attached to an overhead gantry or other track-lick structure.

Figure 17:
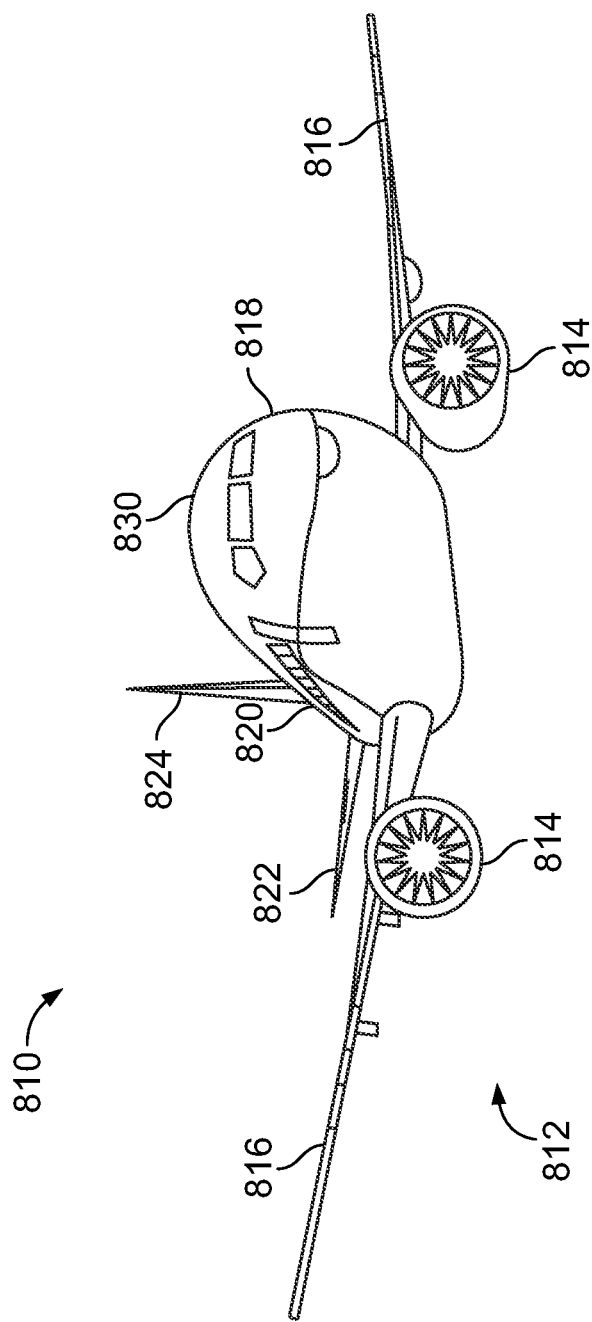
FIG. 17 illustrates a perspective front view of an aircraft, according to an example of the subject disclosure.

FIG. 17 illustrates a perspective front view of an aircraft 810, according to an example of the subject disclosure. The aircraft 810 includes a propulsion system 812 that includes engines 814, for example. Optionally, the propulsion system 812 may include more engines 814 than shown. The engines 814 are carried by wings 816 of the aircraft 810. In other embodiments, the engines 814 may be carried by a fuselage 818 and/or an empennage 820. The empennage 820 may also support horizontal stabilizers 822 and a vertical stabilizer 824.

The fuselage 818 of the aircraft 810 defines an internal cabin 830, which includes a flight deck or cockpit, one or more work sections (for example, galleys, personnel carry-on baggage areas, and the like), one or more passenger sections (for example, first class, business class, and coach sections), one or more lavatories, and/or the like. The fuselage 818 includes one or more objects, such as windows, which are configured to be engaged by the systems 100 shown and described with respect to FIGS. 1-16.

Alternatively, instead of an aircraft, examples of the subject disclosure may be used with various other vehicles, such as automobiles, buses, locomotives and train cars, watercraft, and the like. Further, examples of the subject disclosure may be used with respect to fixed structures, such as commercial and residential buildings.

Figure 18:
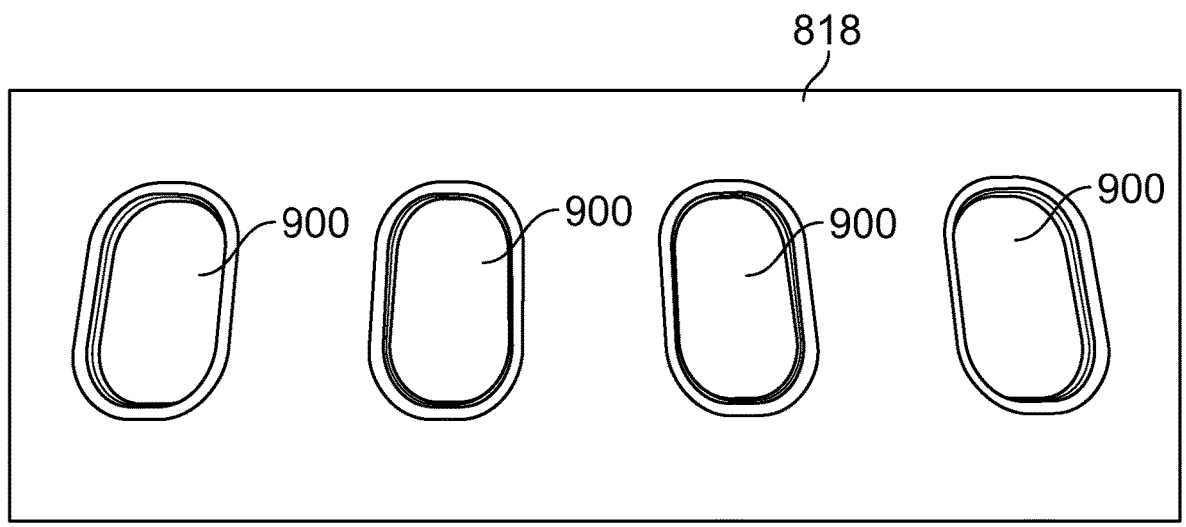
FIG. 18 illustrates a side view of windows within a fuselage, according to an example of the subject disclosure.

FIG. 18 illustrates a side view of windows 900 within the fuselage 818, according to an example of the subject disclosure. The windows 900 are examples of objects 104, such as shown and described with respect to FIGS. 1-16.

Figure 19:
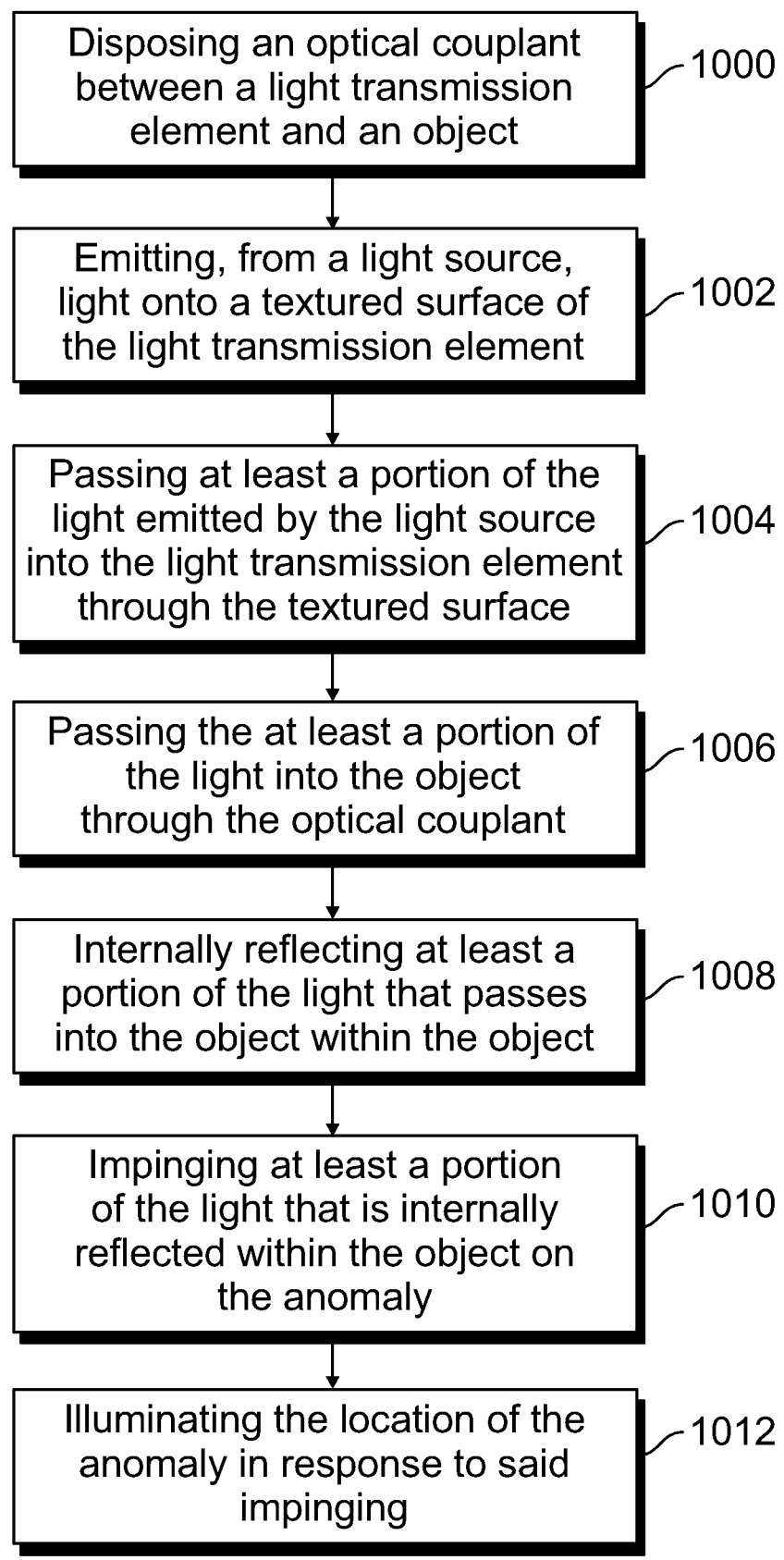
FIG. 19 illustrates a flow chart of a method of identifying an anomaly of an object, according to an example of the subject disclosure.

FIG. 19 illustrates a flow chart of a method of identifying an anomaly of an object, according to an example of the subject disclosure. Referring to FIGS. 1 and 19, the method includes disposing (1000) the optical couplant 116 between the light transmission element 114 and the object 104; emitting (1002) from the light source 112, light 120 onto the textured surface 126 of the light transmission element 114; passing (1004) at least a portion of the light 120 (such as the rays 121) emitted by the light source 112 into the light transmission element 114 through the textured surface 126; passing (1006) the at least a portion of the light 120 into the object 104 through the optical couplant 116; internally reflecting (1008) at least a portion of the light 120 (such as the ray 121') that passes into the object 104 within the object 104; impinging (1010) the at least a portion of the light 120 that is internally reflected within the object 104 on the anomaly 102; and illuminating (1012) (such as via illumination 130) the location of the anomaly 102 in response to said impinging 1010.

Further, the disclosure comprises examples according to the following clauses:

Clause 1. A system for detecting an anomaly of an optically transparent or translucent object, the system comprising:
  a light source configured to emit light;
  a light transmission element having a textured surface; and
  an optical couplant configured to be disposed between the light transmission element and the object, wherein at least a portion of the light emitted by the light source is configured to pass into the light transmission element through the textured surface and pass into the object through the optical couplant, and wherein at least a portion of the light that passes into the object internally reflects within the object and impinges on the anomaly to provide an illumination that indicates the location of the anomaly.

Clause 2. The system of Clause 1, wherein the object is a window of a vehicle.

Clause 3. The system of Clauses 1 or 2, wherein the textured surface is formed on a first surface of the light transmission element, wherein the first surface is opposite from a second surface that is smooth, and wherein the first surface is between the light source and the second surface.

Clause 4. The system of Clause 3, wherein the textured surface comprises a plurality of variances, and wherein the second surface is devoid of variances.

Clause 5. The system of any of Clauses 1-4, wherein the optical couplant comprises one or more of water, optically clear liquid, or gel.

Clause 6. The system of any of Clauses 1-5, wherein the light source is configured to emit the light onto the light transmission element at an acute angle.

Clause 7. The system of any of Clauses 1-6, further comprising an imaging device configured to acquire one or more images of the object as the light source emits the light onto the light transmission element.

Clause 8. The system of any of Clauses 1-7, further comprising a couplant applicator that is configured to apply the optical couplant between the light transmission element and the object.

Clause 9. The system of any of Clauses 1-8, further comprising a control unit in communication with the light source, wherein the control unit is configured to control operation of the light source (the control unit can also control the camera, couplant pump, and other components, as described herein).

Clause 10. The system of any of Clauses 1-9, further comprising a support frame, wherein the light source and the light transmission element are coupled to the support frame.

Clause 11. The system of claim 10, further comprising a base having a plurality of wheels, wherein the base is coupled to the support frame.

Clause 12. The system of Clauses 10 or 11, further comprising a rotator coupled to the support frame, wherein the rotator is configured to rotate the system between different orientations.

Clause 13. The system of Clause 10, further comprising a handle coupled to the support frame.

Clause 14. The system of Clause 10 further comprising an unmanned aerial vehicle (UAV) coupled to the support frame.

Clause 15. The system of any of Clauses 10-14, further comprising one or more articulating arms coupled to the support frame.

Claus 16. The system of Clause 15, further comprising a mobile base coupled to the one or more articulating arms.

Clause 17. The system of any of Clauses 1-16, further comprising a couplant distributor configured to apply the optical couplant between the light transmission element and the object.

Clause 18. The system of Clause 17, wherein the couplant distributor comprises an outer ring having a plurality of fluid outlets in fluid communication with an internal fluid passage.

Clause 19. A method for detecting an anomaly of an object, the method comprising:
  disposing an optical couplant between a light transmission element and the object;
  emitting, from a light source, light onto a textured surface of the light transmission element;
  passing at least a portion of the light emitted by the light source into the light transmission element through the textured surface;
  passing the at least a portion of the light into the object through the optical couplant;
  internally reflecting at least a portion of the light that passes into the object within the object;
  impinging the at least a portion of the light that is internally reflected within the object on the anomaly; and
  illuminating the location of the anomaly in response to said impinging.

Clause 20. A system for detecting an anomaly of an object, the system comprising:
- a light source configured to emit light;
- a light transmission element having a textured surface, wherein the textured surface is formed on a first surface of the light transmission element, wherein the first surface is opposite from a second surface that is smooth, wherein the first surface is between the light source and the second surface, wherein the textured surface comprises a plurality of variances, wherein the second surface is devoid of variances, and wherein the light source is configured to emit the light onto the light transmission element at an acute angle;
- a couplant applicator that is configured to apply optical couplant between the light transmission element and the object, wherein at least a portion of the light emitted by the light source is configured to pass into the light transmission element through the textured surface and pass into the object through the optical couplant, and wherein at least a portion of the light that passes into the object internally reflects within the object and impinges on the anomaly to provide an illumination that indicates the location of the anomaly; and
- an imaging device configured to acquire one or more images of the object as the light source emits the light onto the light transmission element.

As described herein, examples of the subject disclosure provide systems and methods for detecting anomalies in objects, such as transparent or translucent structures (for example, windows, windshields, or the like). Further, examples of the subject disclosure provide systems and methods that allow individuals to readily identify anomalies in such objects.

While various spatial and directional terms, such as top, bottom, lower, mid, side, horizontal, vertical, front and the like can be used to describe examples of the subject disclosure, it is understood that such terms are merely used with respect to the orientations shown in the drawings. The orientations can be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described examples (and/or aspects thereof) can be used in combination with each other. In addition, many modifications can be made to adapt a particular situation or material to the teachings of the various examples of the disclosure without departing from their scope. While the dimensions and types of materials described herein are intended to define the parameters of the various examples of the disclosure, the examples are by no means limiting and are exemplary examples. Many other examples will be apparent to those of skill in the art upon reviewing the above description. The scope of the various examples of the disclosure should, therefore, be determined with reference to the appended claims, along with the full scope of equivalents to which such claims are entitled. In the appended claims and the detailed description herein, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various examples of the disclosure, including the best mode, and also to enable any person skilled in the art to practice the various examples of the disclosure, including making and using any devices or systems and performing any incorporated methods. The patentable scope of the various examples of the disclosure is defined by the claims, and can include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A system for detecting an anomaly of an object, the system comprising:
   - a light source configured to emit light;
   - a light transmission element having a first surface and a second surface opposite from the first surface, wherein a textured surface is formed on the first surface, wherein the second surface is smooth, and wherein the first surface is between the light source and the second surface; and
   - an optical couplant distinct from the light transmission element, the optical couplant configured to be disposed between the light transmission element and the object, wherein at least a portion of the light emitted by the light source is configured to pass into the light transmission element through the textured surface and pass into the object through the optical couplant, and wherein at least the portion of the light that passes into the object internally reflects within the object and impinges on the anomaly to provide an illumination that indicates a location of the anomaly.

2. The system of claim 1, wherein the object is a window of a vehicle.

3. The system of claim 1, wherein the textured surface comprises a plurality of variances, and wherein the second surface is devoid of variances.

4. The system of claim 1, wherein the optical couplant comprises water, optically clear liquid, or gel.

5. The system of claim 1, wherein the light source is configured to emit the light onto the light transmission element at an acute angle.

6. The system of claim 1, further comprising an imaging device configured to acquire one or more images of the object as the light source emits the light onto the light transmission element.

7. The system of claim 1, further comprising a couplant applicator that is configured to apply the optical couplant between the light transmission element and the object.

8. The system of claim 1, further comprising a control unit in communication with the light source, wherein the control unit is configured to control operation of the light source.

9. The system of claim 1, further comprising a support frame, wherein the light source and the light transmission element are coupled to the support frame.

10. The system of claim 9, further comprising a base having a plurality of wheels, wherein the base is coupled to the support frame.

11. The system of claim 9, further comprising a rotator coupled to the support frame, wherein the rotator is configured to rotate the system between different orientations.

12. The system of claim 9, further comprising a handle coupled to the support frame.

13. The system of claim 9, further comprising an unmanned aerial vehicle (UAV) coupled to the support frame.

14. The system of claim 9, further comprising one or more articulating arms coupled to the support frame.

15. The system of claim 14, further comprising a mobile base coupled to the one or more articulating arms.

16. The system of claim 1, further comprising a couplant distributor configured to apply the optical couplant between the light transmission element and the object.

17. The system of claim 16, wherein the couplant distributor comprises an outer ring having a plurality of fluid outlets in fluid communication with an internal fluid passage.

18. A method for detecting an anomaly of an object, the method comprising:
    disposing an optical couplant between a light transmission element and the object;
    emitting, from a light source, light onto a first surface of the light transmission element, wherein the first surface is opposite from a second surface, wherein a textured surface is formed on the first surface, wherein the second surface is smooth, and wherein the first surface is between the light source and the second surface;
    passing at least a portion of the light emitted by the light source into the light transmission element through the textured surface;
    passing the at least a portion of the light into the object through the optical couplant;
    internally reflecting at least the portion of the light that passes into the object within the object;
    impinging the at least the portion of the light that is internally reflected within the object on the anomaly; and
    illuminating a location of the anomaly in response to said impinging.

19. A system for detecting an anomaly of an object, the system comprising:
    a light source configured to emit light;
    a light transmission element having a textured surface, wherein the textured surface is formed on a first surface of the light transmission element, wherein the first surface is opposite from a second surface that is smooth, wherein the first surface is between the light source and the second surface, wherein the textured surface comprises a plurality of variances, wherein the second surface is devoid of variances, and wherein the light source is configured to emit the light onto the light transmission element at an acute angle;
    a couplant applicator that is configured to apply optical couplant between the light transmission element and the object, wherein at least a portion of the light emitted by the light source is configured to pass into the light transmission element through the textured surface and pass into the object through the optical couplant, and wherein at least the portion of the light that passes into the object internally reflects within the object and impinges on the anomaly to provide an illumination that indicates a location of the anomaly; and
    an imaging device configured to acquire one or more images of the object as the light source emits the light onto the light transmission element.

20. The system of claim 3, wherein the plurality of variances include one or more of grooves, channels, or divots formed by application of a wire brush, file, sand paper, or steel wool.

* * * * *